US005717056A

United States Patent [19]

Varadarajan et al.

[11] Patent Number: 5,717,056
[45] Date of Patent: Feb. 10, 1998

[54] METHOD FOR PREPARING POLYCARBONATE BY SOLID STATE POLYMERIZATION

[75] Inventors: Godavarthi Satyanarayana Varadarajan, Niskayuna, N.Y.; Swaminathan Sivaram; Bhaskar Bhairavnath Idage, both of Pune, India; Joseph Anthony King, Jr., Schenectady, N.Y.

[73] Assignee: General Electric Company, Schenectady, N.Y.

[21] Appl. No.: 767,740

[22] Filed: Dec. 17, 1996

Related U.S. Application Data

[63] Continuation-in-part of Ser. No. 653,166, May 24, 1996.
[51] Int. Cl.$^6$ ..................................................... C08G 64/00
[52] U.S. Cl. ..................................... 528/196; 528/198
[58] Field of Search ............................... 528/196, 198

[56] References Cited

U.S. PATENT DOCUMENTS 4,948,871  8/1990  Fukuoka et al. ....................... 528/481
5,204,377  4/1993  Fukawa et al. .......................... 521/60
5,266,659  11/1993  Sivaram et al. ......................... 525/463

Primary Examiner—Terressa Mosley
Attorney, Agent, or Firm—William H. Pittman

[57] ABSTRACT

Solid state polycarbonate formation comprises an initial step of converting a precursor polycarbonate to an enhanced crystallinity precursor polycarbonate and a second step of polymerizing said enhanced crystallinity precursor polycarbonate in the solid state. Several options are employed. These include modifying the precursor polycarbonate by contact with a dihydroxy compound or diaryl carbonate, conversion of the precursor polycarbonate to the enhanced crystallinity polymer by contact with at least one compound selected from the group consisting of alkali metal hydroxides, tetraalkylammonium hydroxides, tetraalkylammonium carboxylates, tetraalkylphosphonium hydroxides and tetraalkylphosphonium carboxylates, and conducting the solid state polymerization in the presence of a catalytic amount of at least one tetralkylammonium or tetraalkylphosphonium carboxylate. The preferred tetralkylammonium compounds are tetramethylammonium maleate and tetramethylammonium hydroxide. Polymerization may be conducted in the presence of a solvent resistance-imparting monomer such as hydroquinone or resorcinol or a branching agent such as 1,1,1-tris(4-hydroxyphenyl)ethane.

25 Claims, No Drawings

METHOD FOR PREPARING POLYCARBONATE BY SOLID STATE POLYMERIZATION

CROSS-REFERENCE TO RELATED APPLICATION

This application is a continuation-in-part of copending application Serial No. 08/653,166 filed May 24, 1996.

BACKGROUND OF THE INVENTION

This invention relates to the preparation of polycarbonates, and more particularly to their preparation by polymerization in the solid state.

The methods widely known for preparation of polycarbonates are the interfacial method and the melt method. In interfacial polymerization, a dihydroxyaromatic compound is contacted with phosgene in a mixed aqueous-organic solution, in the presence of an acid acceptor and an amine as catalyst. This method is falling out of favor because of the toxicity of phosgene and the environmental hazards of methylene chloride, the most commonly employed organic solvent. A similar method, in which oligomeric chloroformates are prepared interfacially and are then converted to high molecular weight polycarbonate, has similar disadvantages.

In the melt preparation method, a bisphenol is contacted with a diaryl carbonate in the melt in the presence of a suitable catalyst. An oligomeric polycarbonate is first produced and it is converted to a high molecular weight polycarbonate by increasing the polymerization temperature. There are also disadvantages in this process, one of them being the high viscosity of the melt polymerization mixture, especially during the molecular weight building step, which causes difficulty of handling.

A third option for polycarbonate formation, solid state polymerization, has become known in recent years. The first polymerization step in the solid state process is oligomer formation by melt polymerization. The oligomer is then subjected to treatment to induce crystallinity therein. The crystallinity-enhanced oligomer is finally heated to a temperature between its glass transition temperature (Tg) and its melting temperature (Tm) in the presence of a catalyst, whereupon solid state polymerization occurs to produce a high molecular weight polycarbonate.

U.S. Pat. No. 4,948,871, the disclosure of which is incorporated by reference herein, discloses a method for solid state polymerization in which crystallinity is enhanced by solvent treatment or heat treatment. Solvent treatment typically involves the same solvents used for interfacial polymerization and is thus disadvantageous. Heat treatment requires undesirably lengthy heating times, typically about 15–36 hours and sometimes as high as 200 hours.

A second patent disclosing solid state polymerization is U.S. Pat. No. 5,266,659, also incorporated by reference herein. It discloses the use of programmed heating as an improved heat treatment method of crystallinity enhancement. Thus, this procedure has some of the same disadvantages as other operations which include heat treatment. Moreover, the solid state polymerization step requires an oligomer having a relatively high (at least about 0.3 dl/g) intrinsic viscosity. In one of its aspects it further requires the use of an alkali metal-containing catalyst which may cause problems if it remains in the polycarbonate, particularly when used for data storage as in optical disks.

Other references of possible interest regarding solid state polymerization include U.S. Pat. Nos. 5,204,377 and 5,214,073, German application 4,038,768 and PCT application 90/07,536.

Another problem with previously known solid state procedures is that they are very sensitive to the molecular structure of the polycarbonate end groups. In general, the aforementioned prior art considers it necessary to employ an oligomeric intermediate which contains on the order of 50% hydroxy and 50% aryl carbonate end groups or greater (5,266,659) or greater than 50% aryl carbonate end groups (4,948,871).

Substantial deviation from such conditions, e.g., an aryl carbonate end group proportion significantly less than 50%, materially impairs the solid state polymerization process. There appear, however, to be no disclosed procedures for adjusting or modifying end groups to optimize them for solid state polymerization.

Branched polycarbonates are frequently used in such applications as blow molding, including the production of hollow articles of large volumes and large panels. Such branched polycarbonates are required to have high melt strength, high shear sensitivity and a high complex viscosity ratio. In order to achieve such properties, polycarbonate with a critical degree of branching is required.

It is known that branched polycarbonates which exhibit high melt strength properties can be prepared either by interfacial polycondensation or by melt phase carbonate interchange reactions using small amounts of polyhydric phenols as branching agents. The use of polyhydric phenols having three or more hydroxy groups per molecule such as 1,1,1-tris(4-hydroxyphenyl)ethane (hereinafter "THPE"), as branching agent for high melt strength blow moldable polycarbonate resins prepared by interfacial polycondensation has been described in U.S. Pat. No. 3,799,953. Other methods known for the preparation of branched polycarbonates through interfacial polycondensation methods include the use of cyanuric chloride (U.S. Pat. No. 3,541,049) branched dihydric phenols (U.S. Pat. No. 4,469,861) and 3,3-bis-(4-hydroxyphenyl)oxyindoles (U.S. Pat. No. 4,185,009) as branching agents.

Methods for the preparation of melt branched polycarbonates using THPE have been described in U.S. Pat. No. 4,888,400 and European application 400,478. Triphenyl trimellitate (European application 140,341) and triglycidyl isocyanurate (U.S. Pat. No. 4,959,422) have also been used as melt phase branching agents.

Linear high molecular weight polycarbonates can be polycondensed in the melt phase with THPE resulting in the production of branched polycarbonates suitable for blow molding applications (U.S. Pat. No. 5,021,521). However, this process requires high temperature (270°–300° C.) and special equipment.

Therefore, it is highly desirable to devise improved solid state polymerization methods which permit crystallinity to be induced in a relatively short time, which enable the use of catalysts not containing substantial proportions of alkali metals and the use of relatively low molecular weight oligomers, and which permit the employment of oligomeric intermediates having a wide range of end group concentrations. It is further desirable to devise solid state polymerization methods which may be varied to make possible such operations as the preparation of branched polycarbonates and the repolymerization of recycled polycarbonate, including material recovered from scrap optical disks and extruder wastes. The latter typically comprise a major proportion of polycarbonate in combination with minor proportions of fibrous reinforcement, fillers and pigments.

SUMMARY OF THE INVENTION

The present invention provides a number of process improvements in solid state polycarbonate preparation which achieve the above-described goals. The specific improvements include convenient methods for modifying the end group concentration of the solid state polymerization precursor whereby precursors initially having any end group distribution may undergo solid state polymerization, for employing oligomers of low molecular weight and intrinsic viscosity in the solid state polymerization step, for chemically promoting crystallization and for using a new genus of catalysts for polymerization in the solid state. The various improvement options may be employed singly or in various combinations.

The invention, therefore, is a method for preparing a polycarbonate which comprises the steps of (A) converting a precursor polycarbonate to an enhanced crystallinity precursor polycarbonate, and (B) polymerizing said enhanced crystallinity precursor polycarbonate in the solid state, said method further comprising at least one of the following options:

I. contacting said precursor polycarbonate, prior to or simultaneously with step A, with an effective proportion of a modifying reagent selected from the group consisting of dihydroxyaromatic compounds, dihydroxyaliphatic compounds and diaryl carbonates;

II. converting said precursor polycarbonate to said enhanced crystallinity precursor polycarbonate in step A by contact at a temperature above about 110° C. with a catalytic amount of at least one compound selected from the group consisting of alkali metal hydroxides, alkali metal alkoxides, tetraalkylammonium hydroxides, tetraalkylammonium alkoxides, tetraalkylammonium carboxylates, tetraalkylphosphonium hydroxides, tetraalkylphosphonium alkoxides and tetraalkylphosphonium carboxylates; and III. polymerizing said enhanced crystallinity precursor polycarbonate in step B by contact at a temperature between its glass transition temperature and the melting temperature with a catalytic amount of at least one tetraalkylammonium or tetraalkylphosphonium carboxylate.

DETAILED DESCRIPTION

Preferred Embodiments

Polycarbonates which may be prepared by the method of this invention typically comprise structural units of the formula:

wherein at least about 60% of the total number of R groups are aromatic organic radicals and the balance thereof are aliphatic, alicyclic, or aromatic radicals. Preferably, each R is an aromatic organic radical and more preferably a radical of the formula:

wherein each $A^1$ and $A^2$ is a monocyclic divalent aryl radical and Y is a bridging radical in which one or two carbon atoms separate $A^1$ and $A^2$. Such radicals are derived from dihydroxyaromatic compounds of the formulas HO—R—OH and HO—$A^1$—Y—$A^2$—OH respectively. For example, $A^1$ and $A^2$ generally represent unsubstituted phenylene, especially p-phenylene which is preferred, or substituted derivatives thereof. The bridging radical Y is most often a hydrocarbon group and particularly a saturated group such as methylene, cyclohexylidene, or isopropylidene which is preferred. Thus, the most preferred polycarbonates are those derived entirely or in part from 2,2-bis(4-hydroxyphenyl) propane, also known as "bisphenol A".

The essential starting material in the method of this invention is a precursor polycarbonate. It may be a polycarbonate oligomer of the type produced by the first step of a melt polycarbonate process or by bischloroformate oligomer preparation followed by hydrolysis and/or endcapping and isolation. Such oligomers most often have an intrinsic viscosity in the range of about 0.06–0.30 dl/g, all intrinsic viscosity values herein being as determined in chloroform at 25° C.

The precursor polycarbonate may be a branched polycarbonate, formed by the reaction of a linear polycarbonate or its precursor(s) with a branching agent such as THPE. It may also be a copolycarbonate, particularly a copolycarbonate oligomer or high molecular weight copolycarbonate containing units adapted to maximize solvent resistance. Hydroquinone carbonate units are particularly suitable for this purpose, as disclosed in U.S. Pat. No. 4,920,200. Such units will typically comprise about 25–50% of total carbonate units in the polymer. Conversion to the branched polycarbonate or copolycarbonate may precede or occur simultaneously with step A; i.e., with the conversion of the precursor polycarbonate to an enhanced crystallinity polymer.

The precursor polycarbonate may also be a recycled polycarbonate. For example, recycled polymer from compact disks may be employed. Such recycled material typically has a molecular weight which has been degraded from that of the originally polymerized material as shown by an intrinsic viscosity in the range of about 0.25–1.0 dl/g. It may be obtained from scrap polycarbonate by dissolution in a chlorinated organic solvent such as chloroform, methylene chloride or 1,2-dichloroethane followed by filtration of the insoluble material or other art-recognized procedures for separation of non-polycarbonate constituents. Other types of polycarbonate, such as interfacially prepared polycarbonate and polycarbonate extruder wastes, may also be employed as precursors.

In option I of the invention, the precursor polycarbonate is contacted with a modifying reagent selected from the group consisting of dihydroxyaromatic compounds, dihydroxyaliphatic compounds and diaryl carbonates. The diaryl carbonates are used when necessary to increase the proportion of aryl carbonate end groups in the precursor polycarbonate; the dihydroxy compounds may decrease said proportion. Either reagent may be incorporated into the polymer molecule before step A or during subsequent processing. This option is particularly useful when the precursor polymer is a recycled polycarbonate, in which the end groups may be entirely aryl carbonate or nearly so, or when it is obtained by interfacial polymerization or by direct carbonylation of a bisphenol as disclosed, for example, in U.S. Pat. No. 4,096,169.

Any dihydroxyaromatic or dihydroxyaliphatic compound may be used as a modifying reagent. Suitable compounds include the aforementioned ones of the formulas HO—R—OH and HO—$A^1$—Y—$A^2$—OH, illustrated by resorcinol, hydroquinone, catechol and bisphenols; glycols such as ethylene glycol and propylene glycol; and polyhydroxyaliphatic compounds such as pentaerythritol, glycerol, glyceryl monopalmitate and glyceryl monostearate.

The preferred dihydroxyaromatic compounds are those which form relatively volatile carbonates, easily removable from the product during solid state polymerization, since such carbonates may be formed as by-products, particularly from any modifying reagent which may be present in excess of the amount which reacts. Thus, catechot and ethylene glycol, especially the former, are often most preferred.

Similarly, any diaryl carbonate may be used to decrease the hydroxy end group proportion. Diphenyl carbonate is usually preferred. Other useful carbonates include ditolyl carbonate, dixylyl carbonate, bis(chlorophenyl) carbonate, biscresyl carbonate, dinaphthyl carbonate, bis(biphenylyl) carbonate, bis(nitrophenyl) carbonate and dicarbophenoxy bisphenol A.

Reaction of the precursor polycarbonate with the dihydroxyaromatic or dihydroxyaliphatic compound or diaryl carbonate may occur simultaneously with or prior to conversion to the enhanced crystallinity precursor polycarbonate in step A. Most often, the two will occur simultaneously although the modifying reagent may be introduced before said conversion.

The modification reaction may be effected at temperatures of about 10° C. or higher, in the solid state or in solution. The presence of a suitable catalyst is generally preferred; operative catalysts include the transesterification catalysts known in the art, such as tetraalkylammonium and tetraalkylphosphonium hydroxides and alkali metal bases, as well as tetraalkylammonium and tetraalkylphosphonium carboxylates of the type useful as crystallinity enhancing catalysts as described hereinafter.

The proportion of modifying reagent is a proportion at least theoretically effective to convert the precursor polycarbonate to a material having about 20–80% (by number), preferably 40–60%, hydroxy end groups. A suitable proportion may be determined by simple experimentation. In the case of catechol, amounts up to about 5% and most often in the range of about 0.001–1.0% by weight, based on precursor polycarbonate, are usually sufficient. Larger proportions of bisphenol A may be required, perhaps because it has a tendency to undergo cracking or other side reactions prior to incorporation. In general, amounts in the range of about 3–5% by weight of bisphenol A are employed. Catalyst proportions for option I are usually in the range of about 1–500 ppm based on precursor polycarbonate.

In step A of the solid state polycarbonate preparation method, the precursor polycarbonate is converted to an enhanced crystallinity polymer. This may be achieved by known methods.

For example, the aforementioned U.S. Pat. No. 4,948,871 describes preparation of a polycarbonate of high crystallinity by solvent treatment or by heat treatment. Solvent treatment may involve a good solvent or a poor solvent for the precursor polycarbonate, with such materials being suitable as aliphatic and aromatic hydrocarbons such as benzene, toluene and xylene; ethers such as tetrahydrofurane and dioxane; esters such as methyl acetate and ethyl acetate; ketones such as acetone and methyl ethyl ketone and aromatic hydrocarbons such as benzene, toluene and xylene. The proportion of solvent is usually about 1–100 and preferably about 2–50 parts by weight per part of precursor polycarbonate. Typical temperatures for solvent treatment are in the range of about 120°–190° and preferably about 150°–180° C.

Heat treatment to enhance crystallization may be at a temperature higher than the glass transition temperature of the precursor polycarbonate but lower than its melting temperature or the melting temperature of the enhanced crystallinity polymer formed. Alternatively, the precursor polycarbonate may be melted and cooled from the melt.

The aforementioned U.S. Pat. No. 5,266,659 describes another suitable method for preparing the enhanced crystallinity polymer. In this method, the precursor polymer is subjected to programmed heating to predetermined temperatures in the presence of a catalyst. Typical temperatures are in the range of 180°–280° C. at various pressures, most of them being below atmospheric. Typical catalysts are alkali metal bisphenol salts, alkali metal borohydrides and bioxyanion carboxylates and phenolates, such as those disclosed in Puranik et al., *J. Chem. Soc. Perkin Trans.*, 2, 1517–1520 (1993).

Option II of the present invention is still another method for preparing the enhanced crystallinity precursor polycarbonate. It comprises contacting the precursor polycarbonate at a temperature above about 110° C. with an alkali metal hydroxide or alkoxide, a tetraalkylammonium or tetraalkylphosphonium hydroxide, alkoxide or carboxylate or a mixture thereof. The alkyl groups therein are typically $C_{1-8}$ alkyl groups such as methyl n-butyl, n-hexyl or 2-ethylhexyl, with methyl generally being preferred.

Suitable alkali metal hydroxides include sodium hydroxide and potassium hydroxide, both of which cause extremely rapid crystallization but the presence of which in the final polycarbonate product may be detrimental for certain purposes, particularly in applications related to data storage; therefore, the proportion of alkali metal hydroxide if present should not exceed about 5 ppm based on polycarbonate. For the same reason, the tetraalkylammonium and tetraalkylphosphonium, especially the tetraalkylammonium, hydroxides or carboxylates are generally preferred and alkali metal hydroxides are preferably employed, if at all, in combination therewith.

Suitable alkoxides include the $C_{1-8}$ alkoxides, with methoxides being preferred. Alkoxides of polyhydroxy compounds such as ethylene glycol are included.

Suitable carboxylates include the tetraalkylammonium and -phosphonium hydrogen mono- and polycarboxylates, especially dicarboxylates including succinates, maleates, glutarates and adipates. Both bis(tetraalkylammonium-phosphonium) dicarboxylates and tetraalkylammonium-phosphonium hydrogen dicarboxylates are suitable and the two are generally interchangeable; therefore, the designation of such a compound hereinafter may include either compound individually or a mixture thereof. Tetraalkylammonium maleates are the preferred carboxylates. The proportion of catalyst typically employed is in the range of about 10–200 ppm based on precursor polycarbonate.

Option II may employ crystallization under solvent-induced or heat-induced conditions, as described hereinabove. It is preferred to contact the catalyst with the precursor polycarbonate at a temperature in the range of about 120°–150° C. in an inert atmosphere, such as nitrogen or argon; nitrogen is preferred. The rate of crystallinity enhancement may be altered by altering the flow rate of the inert gas. Thus, in illustrative runs a nitrogen gas flow of 3 l/min resulted in a crystallization time of 8 hours, while a flow rate of 6 l/min decreased it to 2 hours. When a tetraalkylammonium hydroxide is present, it is sometimes possible to achieve almost instant crystallinity enhancement.

It is further contemplated to incorporate branching agents and/or solvent resistance-imparting dihydroxyaromatic monomers into the reaction mixture prior to crystallinity enhancement. The most preferred solvent resistance-imparting monomers are resorcinol and hydroquinone. Suitable branching agents include polyhydroxy (i.e., trihydroxy or greater) compounds such as:

THPE (which is generally preferred),
1,3,5-tris(2-hydroxyethyl)cyanuric acid,
4,6-dimethyl-2,4,6-tris(4-hydroxyphenyl)heptane, 2,2-b is[4-(4-hydroxyphenyl) -cyclohexyl]propane,
1,3,5-trihydroxybenzene,
1,2,3-trihydroxybenzene,
1,4-bis[bis(4-hydroxyphenyl)phenyl]benzene,
2,3,4-trihydroxyacetophenone,
2,3,4-trihydroxybenzoic acid,
2,3,4-trihydroxybenzophenone,
2,4,4'-trihydroxybenzophenone,
2',4',6'-trihydroxy-3-(4-hydroxyphenyl) propiophenone,
pentahydroxyflavone,
3,4,5-trihydroxypyrimidine,
3,4,5-trihydroxyphenylmethylamine,
tetrahydroxy-1,4-quinone hydrate,
2,2',4,4'-tetrahydroxybenzophenone and
1,2,5,8-tetrahydroxyanthraquinone.

The proportion of solvent resistance-imparting monomer is an effective proportion to confer solvent resistance on the polycarbonate, which is most often in the range of about 10–50 mole percent based on total theoretical carbonate units. The proportion of branching agent is generally about 0.1–2.0% by weight of the polycarbonate.

For the purpose of solid state polymerization, an enhanced crystallinity precursor polycarbonate having a crystallinity in the range of about 10–30% and especially about 10–20% is generally preferred. If the precursor polycarbonate has an intrinsic viscosity in the range of about 0.06–0.20 dl/g, as when it is an oligomer, crystallinity values in the range of about 10–15% are preferred. If it is a recycled polycarbonate, such as an optical disc regrind or extruder waste material, typically having an intrinsic viscosity on the order of 0.35–0.40 dl/g, a crystallinity value in the range of about 20–30% is preferred. Crystallinity values higher than about 30% are generally not preferred, since polymerization may then be very slow. Crystallinity proportions may be determined by powder X-ray diffraction, comparing a completely amorphous prepolymer and a crystallized prepolymer as described, for example, in the aforementioned U.S. Pat. No. 4,948,871 with reference to drawings not forming part of the patent but present in its file.

Step B is the actual solid state polymerization step. It is effected at a temperature between the glass transition temperature and the melting temperature of the enhanced crystallinity polycarbonate precursor, most often about 10°–50° C. below its melting temperature. In general, temperatures in the range of about 150°–270° and especially about 180°–250° C. are suitable.

As disclosed in the aforementioned U.S. Pat. Nos. 4,948, 871 and 5,266,659, the solid state polymerization step may be achieved in the absence or presence of catalysts. When present, catalysts may be the same as those employed in the crystallinity enhancement step.

According to option III of the present invention, a particularly preferred catalyst for solid state polymerization is the tetraalkylammonium or-phosphonium carboxylate, with tetramethylammonium maleate being preferred by reason of its particular suitability and relatively low cost. Catalyst proportions are usually similar to those employed in option II; i.e., about 10–200 ppm based on enhanced crystallinity precursor polycarbonate. It is most often satisfactory to merely employ the catalyst already present as a result of its employment in the crystallinity enhancement step.

Solid state polymerization may be conducted in a mixer capable of producing intimate gas-solid contact, such as a fixed bed, fluidized bed or paddle mixer, in contact with an inert gas such as nitrogen or argon which serves as the fluidizing gas if a fluidized bed is employed. Said inert gas may serve one or both of the purposes of fluidizing the mixture and volatilizing and removing by-products, including water, hydroxyaromatic compound (such as phenol) corresponding to the carbonate employed to produce the precursor polycarbonate, and any volatile carbonate formed as a by-product. Programmed heating may be advantageously employed. As an alternative to conditions of intimate gas-solid contact, the polymerization may be conducted at reduced pressure, typically less than about 100 torr, preferably with efficient mixing.

It is also contemplated to introduce branching agent and/or solvent resistance-imparting monomer prior to solid state polymerization, particularly if it has not been introduced earlier.

The invention is illustrated by the following examples. For each example, the illustrated options of the invention are designated. Intrinsic viscosities were determined in methylene chloride at 20° C. unless otherwise designated. Hydroxyl numbers were estimated by phosphorus-31 nuclear magnetic resonance, infrared or UV-visible spectrometry, the latter using the method given in *Macromolecules*, 26, 1186 (1993). Weight percent of branching agent incorporated was analyzed by high pressure liquid chromatography after degradative hydrolysis of the polycarbonate using acetonitrile and water.

EXAMPLE 1

(Option II)

A 250-ml, 3-necked round-bottomed flask equipped with a mechanical stirrer, heater and nitrogen purge means was charged with 10 g of a bisphenol A polycarbonate oligomer having an intrinsic viscosity of 0.16 dl/g, 0.25 mg of tetramethylammonium hydroxide and 1 mg of tetramethylammonium maleate. The resulting mixture was heated to 130–140° C. in a nitrogen atmosphere, with stirring, and was then cooled to room temperature and the product, which was the desired enhanced crystallinity polycarbonate oligomer, was removed and mechanically crushed. The particles passing through a 25-mesh screen were collected and shown by analysis to have an intrinsic viscosity of 0.16 dl/g, a Tg of 114° C., a Tm of 224° C. and a crystallinity of 12%.

The enhanced crystallinity polycarbonate oligomer was fluidized in a nitrogen flow of 3 l/min in a glass reactor at 180° for 1 hour, 210° for 1 hour and 230° for 8 hours. The mixture was then cooled to room temperature and the resulting bisphenol A polycarbonate recovered. It had an intrinsic viscosity of 0.58 dl/g, a Tg of 147° C., a Tm of 265° C. and a crystallinity of 42%.

EXAMPLE 2

(Option III)

Bisphenol A (200 g, 0.877 mole), diphenyl carbonate (197.1 g, 0.921 mole) and tetrabutylammonium hydrogen bis(o-nitrobenzoate) ($1.0317 \times 10^{-5}$ mole) were charged to a 2-1 stainless steel autoclave reactor in a nitrogen atmosphere. The resulting mixture was heated at 230° C. for 90 minutes in a nitrogen atmosphere. The temperature was then gradually increased to 300° C. and the pressure was decreased over 3 hours from 760 torr to 1 torr. These temperature-pressure conditions were maintained for 30 minutes. The product was cooled to room temperature, dissolved in chloroform, precipitated with methanol and dried in vacuo. The yield was 200 g of an enhanced crystallinity oligomer having an inherent viscosity of 0.17 dl/g and a hydroxyl number of 11.

In a 100-ml round-bottomed flask, about 10 g of the enhanced crystallinity oligomer was dissolved in 50 ml of chloroform to which a methanolic solution of 0.25 mg of tetramethylammonium maleate and 50 mg of THPE had been added, and the mixture was stirred for 1 hour. The chloroform was evaporated and the polymer was dried under vacuum at 60° C. for 4 hours. It was then pulverized and the particles passing through standard sieves (35–60 mesh) were used for solid state polymerization.

A 3-g sample of enhanced crystallinity oligomer was charged to a fluidized bed reactor and initially conditioned by gradually heating from room temperature to 180° C. and maintaining it at that temperature for 1 hour in a stream of nitrogen. The polymerization reaction was then carried out using nitrogen as the fluidizing gas at 220° C. for 4 hours. The product was dissolved in chloroform and precipitated from methanol to remove the unreacted THPE. The inherent viscosity of the polycarbonate product (in chloroform at 30° C.) was 0.29 dl/g Analysis showed that 0.49% THPE was incorporated.

EXAMPLE 3

(Option III)

The procedure of Example 2 was repeated, using 75 mg of THPE. The inherent viscosity of the polycarbonate product (in chloroform at 30° C.) was 0.29 dl/g Analysis showed that 0.7% THPE was incorporated.

EXAMPLE 4

(Option III)

The procedure of Example 2 was repeated, using 100 mg of THPE. The inherent viscosity of the polycarbonate product (in chloroform at 30° C.) was 0.27 dl/g Analysis showed that 0.96% THPE was incorporated.

EXAMPLE 5

(Option III)

The procedure of Example 2 was repeated, using 150 mg of THPE. The inherent viscosity of the polycarbonate product (in chloroform at 30° C.) was 0.31 dl/g Analysis showed that 1.3% THPE was incorporated, and 2.5% gel formation was observed.

EXAMPLE 6

(Option III)

Bisphenol A (200 g, 0.877 mole), diphenyl carbonate (197.1 g, 0.921 mole) and tetrabutylammonium hydrogen bis(o-nitrobenzoate) (1.0317×10$^{-5}$ mole) were charged to a 2–1 stainless steel autoclave reactor in a nitrogen atmosphere. The resulting mixture was heated at 230° C. for 90 minutes in a nitrogen atmosphere. The temperature was then gradually increased to 300° C. and the pressure was decreased over 3 hours from 760 torr to 1 torr. These temperature-pressure conditions were maintained for 2 hours. The product was cooled to room temperature, dissolved in chloroform, precipitated with methanol and dried in vacuo. The yield was 200 g of an enhanced crystallinity oligomer having an inherent viscosity of 0.42 dl/g and a hydroxyl number of 7.

In a 100-ml round-bottomed flask, about 10 g of the enhanced crystallinity oligomer was dissolved in 50 ml of chloroform to which a methanolic solution of 25 ppm of tetramethylammonium maleate and 0.5% (based on oligomer) of THPE had been added, and the mixture was stirred for 1 hour. The chloroform was evaporated and the polymer was dried under vacuum at 60° C. for 4 hours. It was then pulverized and the particles passing through standard sieves (35–60 mesh) were used for solid state polymerization.

A 3-g sample of enhanced crystallinity oligomer was charged to a fluidized bed reactor and initially conditioned by gradually heating from room temperature to 180° C. and maintaining it at that temperature for 1 hour in a stream of nitrogen. The polymerization reaction was then carried out using nitrogen as the fluidizing gas at 210° C. for 4 hours. The product was dissolved in chloroform and precipitated from methanol to remove the unreacted THPE. The inherent viscosity of the polycarbonate product (in chloroform at 30° C.) was 0.58 dl/g Analysis showed that 0.39% THPE was incorporated, and 1.5% gel formation was observed.

EXAMPLE 7

(Option III)

The procedure of Example 6 was repeated, using 0.75% THPE. The inherent viscosity of the polycarbonate product (in chloroform at 30° C.) was 0.43 dl/g Analysis showed that 0.7% THPE was incorporated, and 4.5% gel formation was observed.

EXAMPLE 8

(Options II, III)

The reaction flask described in Example 1 was charged with 10 g of bisphenol A polycarbonate oligomer, 105 mg of hydroquinone, 203 mg of diphenyl carbonate, 1 mg of tetra-n-butylammonium hydroxide and 1 mg of tetramethylammonium maleate. The mixture was heated to 130°–140° C. in a nitrogen atmosphere with stirring, and was then cooled to room temperature and mechanically crushed. The particles of the polycarbonate oligomer thus formed were passed through a 22 mesh screen.

A 5-g sample of the polycarbonate oligomer was heated in a fluidized bed reactor in a nitrogen flow of 3 l/min, at an initial temperature of 120° C. with the temperature being increased 10° C. after each 2-hour increment to a final temperature of 150° C. Upon cooling, the resulting enhanced crystallinity polycarbonate oligomer was found to have an intrinsic viscosity of 0.18 dl/g, a Tg of 104° C., a Tm of 218° C. and a crystallinity of 16%.

The enhanced crystallinity polycarbonate oligomer was heated in the fluidized bed reactor in a nitrogen flow of 3 l/min, at 180° for 1 hour, 210° for 1 hour and 230° for 8 hours. The product, upon cooling, was found to be the desired solvent-resistant copolycarbonate having an intrinsic viscosity of 0.63 dl/g, a Tg of 150° C., a Tm of 269° C. and a crystallinity of 25%.

EXAMPLE 9

(Options I, II, III)

A 10-g sample of regrind polycarbonate recovered from optical disks was dissolved in 100 ml of chloroform, with stirring, and the solution was filtered. To the filtrate was added 500 mg of bisphenol A, 1 mg of tetramethylammonium maleate and 1 mg of tetra-n-butylammonium hydroxide. The chloroform was removed by vacuum stripping and the resulting enhanced crystallinity polycarbonate was vacuum dried at 70–80° C. It had an intrinsic viscosity of 0.30 dl/g, a Tg of 113° C., a Tm of 220° C. and a crystallinity of 22%.

The enhanced crystallinity polycarbonate was mechanically crushed and the portion passing through a 25 mesh screen was collected. A 5-gram sample thereof was subjected to solid state polymerization in a fluidized bed under a nitrogen flow of 3 l/min, at 180° C. for 1 hour, 210° C. for 1 hour, 230° C. for 4 hours and 245° C. for 4 hours. Upon cooling, the product was found to be the desired polycarbonate having an intrinsic viscosity of 0.62 dl/g, a Tg of 147° C., a Tm of 264° C. and a crystallinity of 32%.

EXAMPLE 10

(Options I, III)

A 100-g sample of bisphenol A polycarbonate extruder wastes was dissolved in 700 ml of 1,2-dichloroethane at 80° C., with stirring. The solution was centrifuged to yield a solution of enhanced crystallinity precursor polycarbonate from which the polycarbonate was precipitated by addition of ethyl acetate. It was washed with ethyl acetate until colorless and vacuum dried at 70–80° C. It had an intrinsic viscosity of 0.43 dl/g, a Tg of 143° C., a Tm of 234° C. and a crystallinity of 28%.

The enhanced crystallinity precursor polycarbonate was powdered and the portion passing through a 25 mesh screen was collected. A 5-g sample thereof was immersed in ethyl acetate and 50 mg of catechol and 1 mg of tetramethylammonium maleate were added. The mixture was heated under reflux for 1 hour, after which the ethyl acetate was removed by vacuum stripping and the solid lo material was vacuum dried. Finally, it was subjected to solid state polymerization in a fluidized bed under a nitrogen flow of 3 l/min, at 180° C. for 1 hour, 210° C. for 2 hours and 230° C. for 4 hours. The product was the desired polycarbonate having an intrinsic viscosity of 0.76 dl/g, a Tg of 158° C., a Tm of 263° C. and a crystallinity of 36%.

EXAMPLE 11

(Options I, II, III)

The procedure of Example 10 was repeated, substituting 500 mg of ethylene glycol for the catechol. The final polycarbonate product had an intrinsic viscosity of 0.51 dl/g, a Tg of 147° C., a Tm of 243° C. and a crystallinity of 29%.

EXAMPLE 12

(Options I, II, III)

A reaction vessel as described in Example 1 was charged with 150 ml of chloroform and 15 g of hydroxy-terminated bisphenol A polycarbonate oligomer having an intrinsic viscosity of 0.20 dl/g and a hydroxy number of 12. Diphenyl carbonate, 300 mg, and 1.5 mg of tetramethylammonium maleate were added and the chloroform was vacuum stripped at 40°–45° C., after which the residue was dried for 1 hour at 50°–60° C. The enhanced crystallinity polycarbonate oligomer thus obtained had an intrinsic viscosity of 0.20 dl/g, a Tg of 121° C., a Tm of 228° C. and a crystallinity of 25%.

The enhanced crystallinity polycarbonate oligomer was polymerized in a fluidized bed reactor in a nitrogen flow of 3 l/min, at 180° C. for 1 hour, 210° C. for 1 hour, 230° C. for 4 hours and 245° C. for 4 hours. Upon cooling, the product was found to be the desired polycarbonate having an intrinsic viscosity of 0.53 dl/g, a Tg of 147° C., a Tm of 262° C. and a crystallinity of 42%.

EXAMPLE 13

(Options I, II)

A 250-ml round-bottomed flask was charged with 20 g of bisphenol A polycarbonate extruder waste and 150 ml of chloroform and the resulting mixture was stirred with a magnetic stirrer. Catechol, 200 mg, and tetramethylammonium maleate, 2 mg, were added and the chloroform was removed by vacuum stripping. After vacuum drying, the residual solid was the desired enhanced crystallinity precursor polycarbonate; it had an intrinsic viscosity of 0.38 dl/g, a Tg of 135° C., a Tm of 228° C. and a crystallinity of about 20%.

The precursor polycarbonate was mechanically crushed and the particles passing through a 25 mesh screen were collected. A 10-g portion thereof was heated at 50 torr, with mechanical agitation, at 180° O for 1 hour, 210° C. for 1 hour and 230° C. for 4 hours, and cooled to room temperature. The resulting polycarbonate had an intrinsic viscosity of 0.45 dl/g, a Tg of 146° C., a Tm of 2JA° C. and a crystallinity of 26%.

What is claimed is:

1. A method for preparing a polycarbonate which comprises the steps of (1) converting a precursor polycarbonate to an enhanced crystallinity precursor polycarbonate, and (b) polymerizing said enhanced crystallinity precursor polycarbonate in the solid state, said method further comprising at least one of the following options:

I. contacting said precursor polycarbonate, prior to or simultaneously with step A, with an effective proportion of a modifying reagent selected from the group consisting of dihydroxyaromatic compounds, dihydroxyaliphatic compounds and diaryl carbonates;

II. converting said precursor polycarbonate to said enhanced crystallinity precursor polycarbonate in step A by contact at a temperature above about 110° C. with a catalytic amount of at least one compound selected from the group consisting of tetraalkylammonium hydroxides, tetraalkylammonium alkoxides, tetraalkylammonium dicarboxylates, tetraalkylphosphonium hydroxides, tetraalkylphosphonium alkoxides and tetraalkylphosphonium carboxylates; and III. polymerizing said enhanced crystallinity precursor polycarbonate in step B by contact at a temperature between its glass transition temperature and the melting temperature with a catalytic amount of at least one tetraalkylammonium dicarboxylate or tetraalkylphosphonium carboxylate.

2. A method according to claim 1 wherein the polycarbonate is a bisphenol A polycarbonate.

3. A method according to claim 1 comprising option I.

4. A method according to claim 3 wherein said contact is in the presence of a transesterification catalyst.

5. A method according to claim 3 wherein the modifying reagent is catechol.

6. A method according to claim 3 wherein the modifying reagent is ethylene glycol.

7. A method according to claim 3 wherein the modifying reagent is bisphenol A.

8. A method according to claim 3 wherein the modifying reagent is diphenyl carbonate.

9. A method according to claim 3 wherein the precursor polycarbonate is a recycled polycarbonate.

10. A method according to claim 1 comprising option II.

11. A method according to claim 10 wherein said conversion is inducted in an inert atmosphere.

12. A method according to claim 11 wherein said compound is a tetra($C_{1-8}$ alkyl)ammonium hydroxide or dicarboxylate or mixture thereof.

13. A method according to claim 12 wherein said compound is a mixture of tetramethylammonium maleate and tetramethylammonium hydroxide.

14. A method according to claim 12 wherein the proportion of said compound is in the range of about 10–200 ppm based on precursor polycarbonate.

15. A method according to claim 11 wherein a solvent resistance-imparting monomer is present during step A.

16. A method according to claim 15 wherein said solvent resistance-imparting monomer is resorcinol or hydroquinone.

17. A method according to claim 11 wherein a polyhydroxy compound is present as a branching agent during step A.

18. A method according to claim 17 wherein the polyhydroxy compound is 1,1,1-tris(4-hydroxyphenyl)ethane.

19. A method according to claim 1 comprising option III.

20. A method according to claim 19 wherein step B is conducted in an inert atmosphere.

21. A method according to claim 20 wherein step B is conducted in a fixed bed or fluidized bed.

22. A method according to claim 19 wherein step B is conducted under reduced pressure.

23. A method according to claim 19 wherein option III is performed in the presence catalytic amount of tetramethylammonium maleate.

24. A method according to claim 19 wherein a solvent resistance-imparting monomer is present during step A.

25. A method according to claim 24 wherein said solvent resistance-imparting monomer is resorcinol or hydroquinone.

* * * * *

UNITED STATES PATENT AND TRADEMARK OFFICE
Certificate

Patent No. 5,717,056　　　　　　　　　　　　　　　　　　　Patented: February 10, 1998

On petition requesting issuance of a certificate for correction of inventorship pursuant to 35 U.S.C. 256, it has been found that the above identified patent, through error and without deceptive intent, improperly sets forth the inventorship.

Accordingly, it is hereby certified that the correct inventorship of this patent is: Godavarthi Varadarajan, Niskayuna, NY; Swaminathan Sivaram, Pune, India; Bhasker Idage, Pune, India; Joseph King, Jr., Schenectady, NY; and Sukhendu Hait, Maharatra, India.

Signed and Sealed this Thirty-First Day of July, 2001.

JAMES J. SEIDLECK
*Supervisory Patent Examiner*
Art Unit 1700